United States Patent
Lu et al.

(10) Patent No.: US 11,693,830 B2
(45) Date of Patent: Jul. 4, 2023

(54) METADATA MANAGEMENT METHOD, SYSTEM AND MEDIUM

(71) Applicant: SUN YAT-SEN UNIVERSITY, Guangdong (CN)

(72) Inventors: Yutong Lu, Guangdong (CN); Zhiguang Chen, Guangdong (CN); Nong Xiao, Guangdong (CN); Fang Liu, Guangdong (CN)

(73) Assignee: SUN YAT-SEN UNIVERSITY, Guangdong (CN)

( * ) Notice: Subject to any disclaimer, the term of this patent is extended or adjusted under 35 U.S.C. 154(b) by 281 days.

(21) Appl. No.: 17/279,606

(22) PCT Filed: Mar. 29, 2019

(86) PCT No.: PCT/CN2019/080279
§ 371 (c)(1),
(2) Date: Mar. 25, 2021

(87) PCT Pub. No.: WO2020/186549
PCT Pub. Date: Sep. 24, 2020

(65) Prior Publication Data
US 2022/0027326 A1    Jan. 27, 2022

(30) Foreign Application Priority Data

Mar. 15, 2019  (CN) .......................... 201910198998.3

(51) Int. Cl.
*G06F 17/00*    (2019.01)
*G06F 7/00*    (2006.01)
(Continued)

(52) U.S. Cl.
CPC ............ *G06F 16/185* (2019.01); *G06F 16/13* (2019.01)

(58) Field of Classification Search
CPC ............................... G06F 16/185; G06F 16/13
(Continued)

(56) References Cited

U.S. PATENT DOCUMENTS

2004/0030822 A1\* 2/2004 Rajan .................... G06F 3/0605
711/4
2005/0091667 A1\* 4/2005 McKee ................. G06F 16/904
715/764
(Continued)

FOREIGN PATENT DOCUMENTS

CN        102024020        4/2011
CN        106170012        11/2016
(Continued)

OTHER PUBLICATIONS

"International Search Report (Form PCT/ISA/210)"of PCT/CN2019/080279, dated Nov. 29, 2019, with English translation thereof, pp. 1-4.
(Continued)

*Primary Examiner* — Pavan Mamillapalli
(74) *Attorney, Agent, or Firm* — JCIP Global Inc.

(57) ABSTRACT

A metadata management method, system and medium are provided. All directories and files in a file system are organized in a tree structure, and all directories and subfiles under a single directory are saved as a whole on a continuous address space of an underlying storage device in the order of creation in sequence. When metadata is updated, update operations on all subdirectories/subfiles under a directory are appended to the tail of the directory in the form of log in order, so that each metadata operation triggers only one IO request. In the process of metadata retrieval, parsing a subdirectory under a parent director requires reading all data on the continuous address space corresponding to the parent
(Continued)

directory, and then searching for a match by means of multiple acceleration methods.

12 Claims, 4 Drawing Sheets

(51) Int. Cl.
*G06F 16/185* (2019.01)
*G06F 16/13* (2019.01)

(58) Field of Classification Search
USPC .......................................................... 707/829
See application file for complete search history.

(56) References Cited

U.S. PATENT DOCUMENTS

2005/0256907 A1* 11/2005 Novik ................. G06F 16/1787
2007/0226443 A1* 9/2007 Giampaolo ......... G06F 16/1734
711/170
2010/0088317 A1* 4/2010 Bone .................... G06F 16/134
709/219
2010/0325181 A1* 12/2010 Skillcorn ................ G06F 16/13
707/829

FOREIGN PATENT DOCUMENTS

CN 106649601 5/2017
CN 107239569 10/2017

OTHER PUBLICATIONS

"Written Opinion of the International Searching Authority (Form PCT/ISA/237)" of PCT/CN2019/080279, dated Nov. 29, 2019, pp. 1-4.

* cited by examiner

METADATA MANAGEMENT METHOD, SYSTEM AND MEDIUM

CROSS-REFERENCE TO RELATED APPLICATION

This application is a 371 of international application of PCT application serial no. PCT/CN2019/080279, filed on Mar. 29, 2019, which claims the priority benefit of China application no. 201910198998.3, filed on Mar. 15, 2019. The entirety of each of the above-mentioned patent applications is hereby incorporated by reference herein and made a part of this specification.

BACKGROUND

Technical Field

The present invention relates to the field of metadata management of file systems for large-scale data storage, in particular to a metadata management method, system and medium for accelerating the metadata access to file systems and improving overall performance of file system data access.

Description of Related Art

In large-scale storage file systems, metadata access has always been a major constraint on IO performance. The metadata access is on a critical path of an IO process, and performance thereof determines an upper limit of data access performance of a whole file system. More than half of IO requests received by a storage device are generated by the metadata access, and optimizing the metadata access will bring huge benefits. Applications tend to make a large number of irregular small requests for file system metadata, and such IO feature poses a huge challenge to metadata optimization. Mainstream file systems have done a lot of fine optimization for metadata, and related technologies can be summarized as follows. In terms of macro-organizational structure, some file systems use distributed metadata management to improve metadata access performance. Given that more than half of the IO requests in the file system come from the metadata access, it is an intuitive optimization means to distribute metadata to multiple servers to provide concurrent access capability for applications. Common parallel file systems such as Lustre, CephFS and BeeGFS adopt such optimization means, and GlusterFS even uses no-center architecture to distribute the metadata to all servers in a file system cluster. With regard to distributed metadata management, researchers propose some technical means such as subtree partition and dynamic load balancing to implement rational distribution of the metadata on the multiple servers. Practice has proved that such clustering method can significantly improve overall performance of the file system metadata access.

In terms of metadata storage structure, traditional file systems generally save the metadata in the form of ordinary files on storage devices. When a directory contains a large number of subdirectories or files, a tree structure is used to index these subdirectories or files. This storage structure can support a single directory to save a large number of subdirectories or files, but access performance will decline significantly with increasing number of the subdirectories or files. The main reason is that access to a subdirectory under a tree index structure may need to search from a tree root to a leaf subnode, which will generate a large number of IO requests and calculation operations. Correspondingly, some new file systems such as TableFS and IndexFS use NoSQL database and Key-Value system to store the metadata. These data structures have good scalability and random-access performance, which can improve the metadata access performance to a certain extent.

Combination of the above multiple technologies has resulted in great improvement in the access performance of the file system, but there is no good solution for some specific problems. One of the most challenging problems is the common large directory problem in many scenarios. For example, in a high-performance computing system, a job that performs multiple rounds of iterative computations generates a large number of processes, each process outputs a file after an iteration step is completed, and all the files generated by each iteration step are saved in a directory. Current large-scale high performance computing jobs often derive processes of more than 100,000 orders of magnitude, resulting in a large number of files in the directory corresponding to each iteration step, and metadata operation for these files has become a main IO bottleneck of the high-performance computing jobs. Some file systems try to alleviate this bottleneck through distributed metadata management. For example, Lustre distributes an entire file system name space to multiple metadata servers in the form of static subtree partition, which, however, cannot solve the problem that a single directory contains a large number of files. CephFS can distribute a large number of files under the same directory to multiple metadata servers according to load. This optimization method can implement the concurrent access to a large number of files in the same directory, but it destroys locality of file metadata. In short, there is still no good solution to the large directory problem.

Read-write amplification problem caused by the metadata access is another important reason for poor performance of the file system metadata. The so-called read-write amplification means that each metadata access issued by an upper application needs to be completed by multiple IO requests. Taking TableFS as an example, metadata thereof is stored in LevelDB (an open-source KV storage engine written by Google engineers Jeff Dean and Sanjay Ghemawat), when creating a file, the metadata corresponding to the file needs to be inserted into a sorted string table (SSTable) of LevelDB, which may cause a splitting operations of SStable and generate multiple write requests. On the contrary, when searching for a file from LevelDB, it may be required to search multiple levels of LevelDB from top to bottom in sequence to generate multiple read requests. Multiple IO requests generated by a file system metadata access are generally interdependent and difficult to be processed concurrently, which essentially results in difficulty in improving the performance of metadata access.

In recent years, computing and IO components in computer systems have achieved significant performance progress. Main frequency and the number of cores of CPU have increased in different degrees. Various accelerators such as GPU and KNL (Knight Landing) have been continuously launched. New storage devices represented by solid-state disks have been gradually popularized. The performance improvement of the computing and IO components has triggered new design ideas in the field of system software. Taking the file system metadata as an example, the traditional file systems tend to do fine optimization for limited computing and IO performance. For example, EXT4 uses HTree tree structure to index all subdirectories and files under the same directory. Specific information of all the subdirectories and files is saved on a leaf node of HTree. In the process of directory search, the search starts from a root node of HTree, and only a small amount of data from the storage device and a small amount of computations are needed to process each level of branch node. The above optimization measures are based on an assumption that the processors and the storage devices have relatively weak performance, thus requiring level-by-level indexing to reduce data reading, writing and processing. Under the current conditions, accelerators represented by GPU can provide concurrent computing power on the kilocore scale, and the new storage devices represented by the solid-state disk can provide GB/s-scale bandwidth and the throughput up to 100,000 IOPS. The powerful computing and IO capabilities provide an opportunity for innovative design of the file system. In particular, the present invention redesigns the storage structure of the file system metadata, abandons the tree index method, and ensures that any metadata operation only trigger one IO request, thus reducing delay caused by data IO, and implementing concurrent data processing by means of multi-threading technology, vector processing technology for CPU and many-core acceleration technology for GPU, and eventually improving overall access performance of the file system metadata.

SUMMARY

Technical problems to be solved by the present invention: in view of the above problems of the prior art, the present invention provides a metadata management method, system and medium, which can effectively solve the large directory problem and result in lower delay in directory path parsing, can reduce the number of IO requests in the process of metadata access, and can accelerate the metadata access of a file system, and improve overall performance of file system data access.

In order to solve the above problems, the present invention adopts the following technical solutions:

A metadata management method, with implementation steps for updating metadata comprising:

1) organizing all directories and files in a file system in a tree structure, and saving all directories and subfiles under a single directory as a whole on a continuous address space of a underlying storage device in the order of creation in sequence; and 2) updating all the subdirectories/subfiles under a directory in the form of log when updating the file system metadata, and appending all metadata updates to the tail of the continuous address space corresponding to the directory in the order of occurrence so that each metadata operation triggers only one IO request.

Optionally, detailed steps of the step 2) comprise:

2.1) receiving the metadata update operation by the file system from an application;

2.2) determining type of the metadata update operation, and going to step 2.3) in the case of creating a new directory or file, or going to step 2.4) in the case of updating an existing directory or file, or going to step 2.5) in the case of deleting an existing directory or file;

2.3) generating a file/directory creation log, and going to step 2.6);

2.4) generating a directory/file update log, and going to step 2.6);

2.5) generating a directory/file deletion log, and going to step 2.6);

2.6) appending the generated log to the tail of a continuous address space, and going to step 2.7); and 2.7) persisting the tail of the continuous address space to a storage device.

Optionally, implementation steps for metadata retrieval comprise:

S1) organizing all directories and files in a file system in a tree structure, and saving all directories and subfiles under a single directory as a whole in a continuous address space of a underlying storage device in the order of creation in sequence; and S2) when performing file system metadata retrieval, parsing a directory path layer by layer from the first component to the last component in sequence and finally obtaining a directory or file to be accessed; and when parsing a subdirectory under a parent directory, reading all data on the continuous address space corresponding to the parent directory, and then searching a target subdirectory or subfile on the read data until the match is successful.

Optionally, the searching a target subdirectory or subfile on the read data specifically is a reverse processing from the tail of the continuous address space to the head, and terminating the retrieval process and immediately returning to the corresponding metadata once the subdirectory/subfile to be searched is retrieved.

Optionally, the parsing a subdirectory under a parent directory comprises the following detailed steps:

S2.1) receiving a metadata retrieval request from an application, and the metadata retrieval request being to retrieve existence of the target directory or file from a parent directory;

S2.2) obtaining related information of all the subdirectories/subfiles under the parent directory into a memory through one read operation, and going to step S2.3);

S2.3) determining size of the parent directory to be parsed, and going to step S2.4) if the total number of the subdirectories/subfiles in the parent directory is less than a preset first threshold $TH_1$; or going to step S2.5) if the total number of the subdirectories/subfiles in the parent directory is between the preset first threshold $TH_1$ and a preset second threshold $TH_2$; or going to step S2.6) if the total number of the subdirectories/subfiles in the parent directory is greater than the preset second threshold $TH_2$;

S2.4) using multi-threading technology to search the target subdirectory or subfile in the parent directory, and going to step 52.7);

S2.5) using a vector instruction to search the target subdirectory or subfile in the parent directory, and going to step 52.7);

S2.6) using many-core acceleration technology to search the target subdirectory or subfile in the parent directory, and going to step 52.7); and S2.7) succeeding in the retrieval if the target subdirectory or subfile is found in the parent directory; or failing in the retrieval, and returning a retrieval result to an upper application.

Optionally, in at least one of the step 52.4), step 52.5) and Step 52.6), when searching the target subdirectory or subfile in the parent directory, the search is performed by reverse processing from the tail of the continuous address space to the head.

The present invention also provides a metadata management method, with implementation steps for metadata retrieval comprising:

S1) organizing all directories and files in a file system in a tree structure, and saving all directories and subfiles under a single directory as a whole in a continuous address space of a underlying storage device in the order of creation in sequence; and S2) when performing file system metadata retrieval, parsing a directory path layer by layer from the first component to the last component in sequence and finally obtaining a directory or file to be accessed; and when parsing a subdirectory under a parent directory, reading all data on the continuous address space, and then searching a target subdirectory or subfile on the read data until the match is successful.

Optionally, the parsing a subdirectory under a parent directory comprises the following detailed steps:

S2.1) receiving a metadata retrieval request from an application, and the metadata retrieval request being to retrieve existence of the target directory or file from a parent directory;

S2.2) obtaining related information of all the subdirectories/subfiles under the parent directory into a memory through one read operation, and going to step 52.3);

S2.3) determining size of the parent directory to be parsed, and going to step 52.4) if the total number of the subdirectories/subfiles in the parent directory is less than a preset first threshold $TH_1$; or going to step 52.5) if the total number of the subdirectories/subfiles in the parent directory is between the preset first threshold $TH_1$ and a preset second threshold $TH_2$; or going to step 52.6) if the total number of the subdirectories/subfiles in the parent directory is greater than the preset second threshold $TH_2$;

S2.4) using multi-threading technology to search the target subdirectory or subfile in the parent directory, and going to step 52.7);

S2.5) using a vector instruction to search the target subdirectory or subfile in the parent directory, and going to step 52.7);

S2.6) using many-core acceleration technology to search the target subdirectory or subfile in the parent directory, and going to step 52.7); and S2.7) succeeding in the retrieval if the target subdirectory or subfile is found in the parent directory; or failing in the retrieval, and returning a retrieval result to an upper application.

The present invention also provides a metadata management system, comprising a computer system programmed to execute the steps of the metadata management method of the present invention, or a computer program programmed to execute the metadata management method of the present invention is stored on a storage medium of the computer system.

The present invention also provides a computer-readable storage medium on which a computer program programmed to execute the metadata management method of the present invention is stored.

Compared with the prior art, the present invention can effectively solve the large directory problem and result in lower delay in directory path parsing, can reduce the number of IO requests in the process of metadata access, and can accelerate the metadata access of a file system, and improve overall performance of file system data access. The main reasons are reflected in the following aspects:

(1) According to the technical solution adopted by the present invention, only one IO operation is required to retrieve a subdirectory or subfile from a parent directory. The present invention aggregates the metadata of all subdirectories/subfiles under a parent directory and saves the metadata on the continuous address space of the storage device to ensure that the metadata of these subdirectories/subfiles can be obtained from the storage device through one read operation. Therefore, when parsing a subdirectory under a parent directory, it only needs to wait for a single IO delay. In contrast, EXT4 indexes all subdirectories/subfiles under a parent directory in two layers of HTree. When parsing a directory, it needs to search in HTree layer by layer and at least two IO operations. Moreover, the IO operations corresponding to the second layer search must wait for the first layer search to be processed before being sent out. The two IO operations cannot be concurrent, so that the directory parsing must tolerate greater delay. Other file systems such as TableFS build complex indexes for all subdirectories/subfiles under the same parent directory, which also results in a similar problem of high directory parsing delay. The present invention takes out all subdirectories/subfiles under a parent directory at the same time through one IO, which will result in large IO operation. However, because the current new storage devices such as solid-state disks can provide high bandwidth, a single large IO operation will not result in significant increase in IO delay.

(2) The present invention can reduce 10 operations caused by metadata update, thus improving metadata update performance. The present invention records all updates of the metadata in the form of log. When operations such as creation, update and deletion of subdirectories/subfiles occur in a parent directory, new information is appended to the tail of the continuous address space in the form of log. When the updated information is persisted to the storage device, only write operations are initiated to the tail of the continuous address space, which will not cause a write amplification effect. In contrast, EXT4 may cause update of the index structure when updating the metadata, and TableFS may cause splitting of the SSTable in LevelDB when updating the metadata, both of which may cause additional write operations.

BRIEF DESCRIPTION OF THE DRAWINGS

In order to illustrate the technical solutions in the embodiments of the present application more clearly, the drawings required for describing the embodiments will be introduced briefly. Obviously, the drawings in the description below are just some of embodiments of the present application. For an ordinary person skilled in the art, other drawings can be obtained based on these drawings without creative work.

DESCRIPTION OF THE EMBODIMENTS

Embodiment 1

Keys of a metadata management method lie in metadata update and metadata retrieval. Keys of implementation mode of the present embodiment lie in how to save metadata of a directory/file on a storage device, and how to quickly retrieve a specific subdirectory/subfile from a parent directory.

Figure 1:
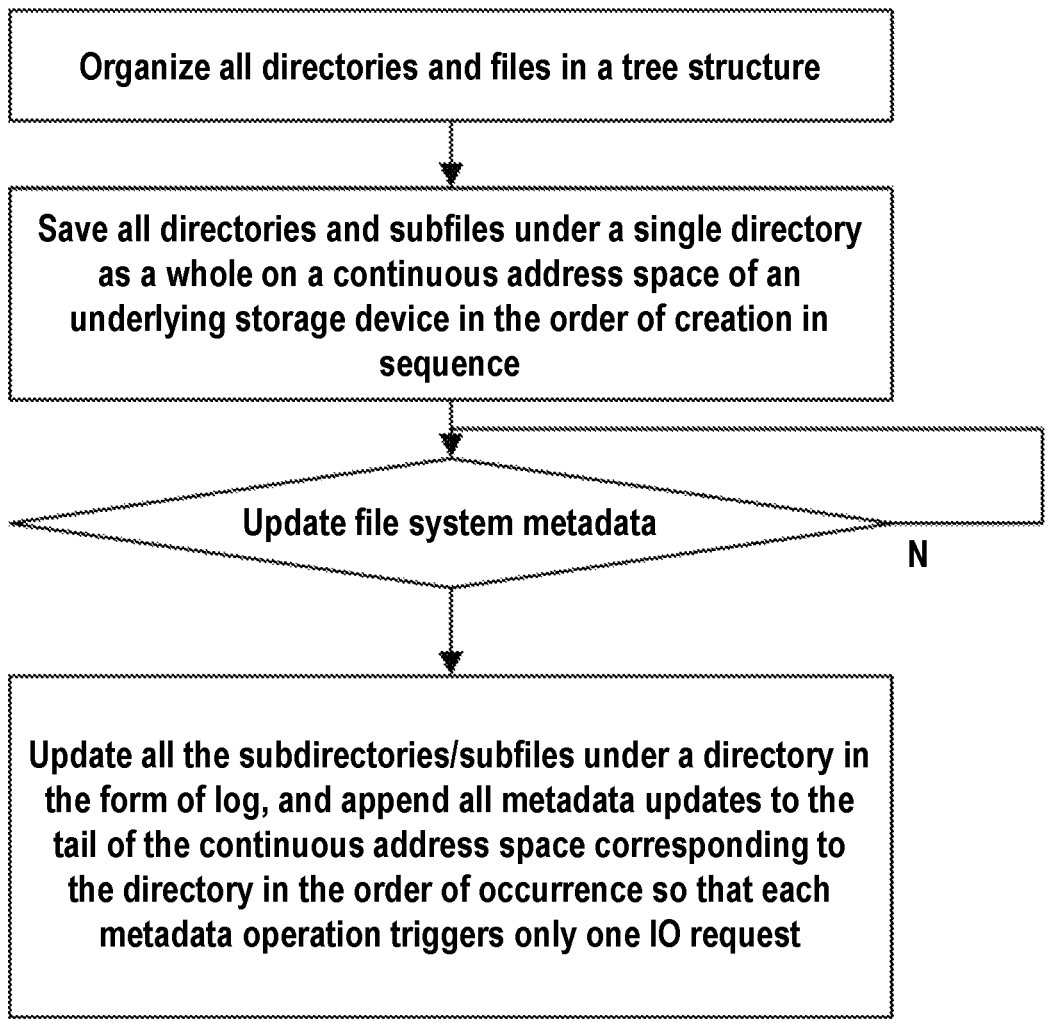
FIG. 1 is a basic flow chart of updating metadata in embodiment 1 of the present invention.

As shown in FIG. 1, implementation steps for updating metadata by the metadata management method of the present embodiment comprise:

1) organizing all directories and files in a file system in a tree structure, and saving all directories and subfiles under a single directory as a whole on a continuous address space of a underlying storage device in the order of creation in sequence; and 2) updating all the subdirectories/subfiles under a directory in the form of log when updating the file system metadata, and appending all metadata updates to the tail of the continuous address space corresponding to the directory in the order of occurrence so that each metadata operation triggers only one IO request.

Figure 2:
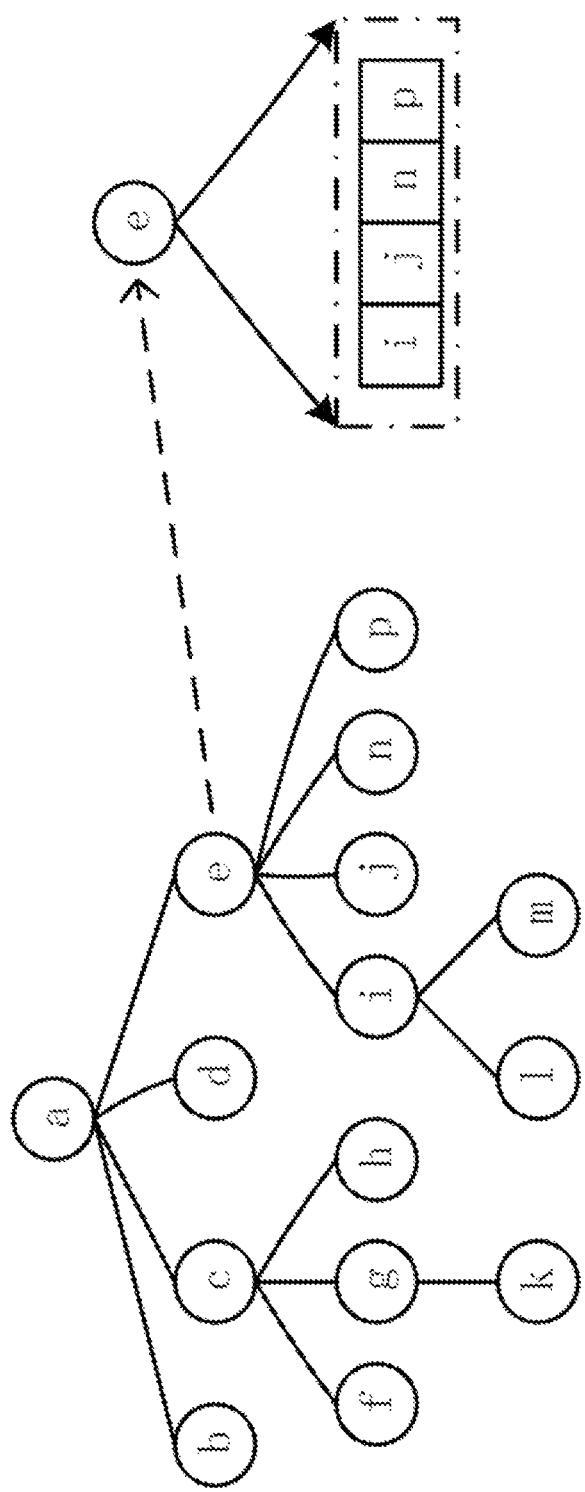
FIG. 2 shows a file system metadata storage structure adopted in embodiment 1 of the present invention.

A storage structure of file system metadata comprises two aspects: the first is logical organization of all directories and files in a file system, that is, file system namespace. At present, most of file systems use the tree structure namespace. The second is the storage structure of a large number of subdirectories/subfiles under a single directory. The two aspects are crucial to access performance of file system metadata. For the first aspect, due to the fact that the tree structured namespace best fits the user's usage habits, the present embodiment keeps such organization unchanged. For the second aspect, there are many different optimization schemes. For example, TableFS integrates all subdirectories/subfiles under a directory and stores them in NoSQL database, and ETX4 uses HTree to index all subdirectories/subfiles under a directory into a two-level tree structure. A common problem of the above methods is that each metadata operation will trigger multiple IO requests, and these IO requests are mutually dependent to a certain extent, resulting in difficulty in concurrent processing, which essentially determines low performance of the file system metadata access. An important idea of the present embodiment is to ensure that only one IO request is triggered for each metadata operation as far as possible. To this end, the present embodiment saves all subdirectories/subfiles under a directory as a whole in the continuous address space of the underlying storage device, and ensures that related information of all the subdirectories/subfiles can be obtained by one read request (similarly, related information of all the subdirectories/subfiles can be saved to the storage device by one write request). In addition, unlike EXT4 which uses HTree to index all subdirectories/subfiles under a directory into a two-level tree structure, the present embodiment does not establish any index or sort all subdirectories/subfiles under a directory, and only saves all the subdirectories/subfiles on the continuous address space in the order of creation in sequence. Because there is no index inside a directory, access to all subdirectories/subfiles under the directory will not introduce IO requests caused by the index, which further ensures the idea that "only one IO request is triggered for each metadata operation". FIG. 2 shows a metadata storage structure adopted in the present embodiment. As shown on the right side of FIG. 2, a file system namespace is organized into a tree structure, in which directory e contains four subdirectories/subfiles i, j, n and p. As shown in the tree structure on the left side of FIG. 2, the file system allocates a continuous address space for the directory e, in which the i, j, n and p are saved in the order of creation/update.

Figure 3:
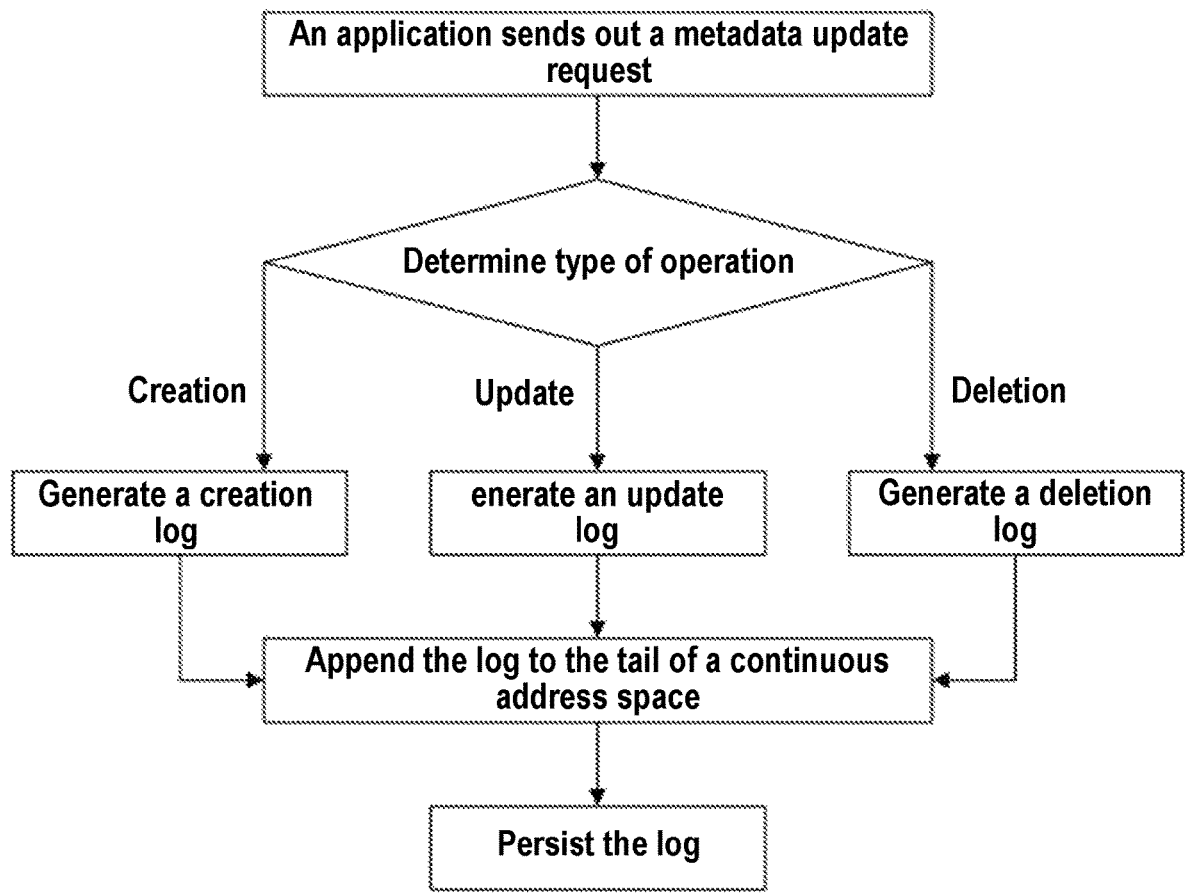
FIG. 3 shows a file system metadata update process in embodiment 1 of the present invention.

As shown in FIG. 3, detailed steps of the step 2) comprise:

2.1) receiving the metadata update operation by the file system from an application;

2.2) determining type of the metadata update operation, and going to step 2.3) in the case of creating a new directory or file, or going to step 2.4) in the case of updating an existing directory or file, or going to step 2.5) in the case of deleting an existing directory or file;

2.3) generating a file/directory creation log, and going to step 2.6); in the present embodiment, the generating a file/directory creation log specifically means that a name, an identification number and other information of the new file/director are encapsulated in the log;

2.4) generating a directory/file update log, and going to step 2.6); In the present embodiment, the generating a directory/file update log specifically means that, this operation, like the file/directory creation, completely generates a new directory or file, the original directory or file is still retained in a storage system, and the information of an old version of a directory or file will not be retrieved due to reverse retrieval method used in the metadata retrieval;

2.5) generating a directory/file deletion log, and going to step 2.6); In the present embodiment, the generating a directory/file deletion log specifically means that the original information of the directory/file is copied, but "deleted" is marked on a special flag bit;

2.6) appending the generated log to the tail of a continuous address space, and going to step 2.7); and 2.7) persisting the tail of the continuous address space to a storage device.

The metadata update comprises creation of a new directory/file, change of original directory/file and deletion of the original directory/file. In the present embodiment, all subdirectories/subfiles under a parent directory are aggregated and saved on a continuous address space. The following three update operations may occur to these subdirectories/subfiles: (1) the creation of a new directory/file: when a new directory or file needs to be created, relevant metadata information is directly appended to the tail of the continuous address space; (2) update of existing directory/file: a file rename request initiated by an upper application will cause an update operation to the existing directory/file, and the log update method is used in the present embodiment, which does not directly update the original directory/file, but directly appends the new metadata information to the tail of the continuous address space; and (3) deletion of existing directory/file: when the upper application initiates a deletion operation, the log update method is used in the present embodiment, which generates a deletion log and directly appends the log to the tail of the continuous address space instead of directly deleting the original directory/file. In a word, in the present embodiment, all subdirectories/subfiles under a directory are updated in the form of log, and all metadata updates are appended to the tail of the continuous address space corresponding to the directory in the order of occurrence.

Figure 4:
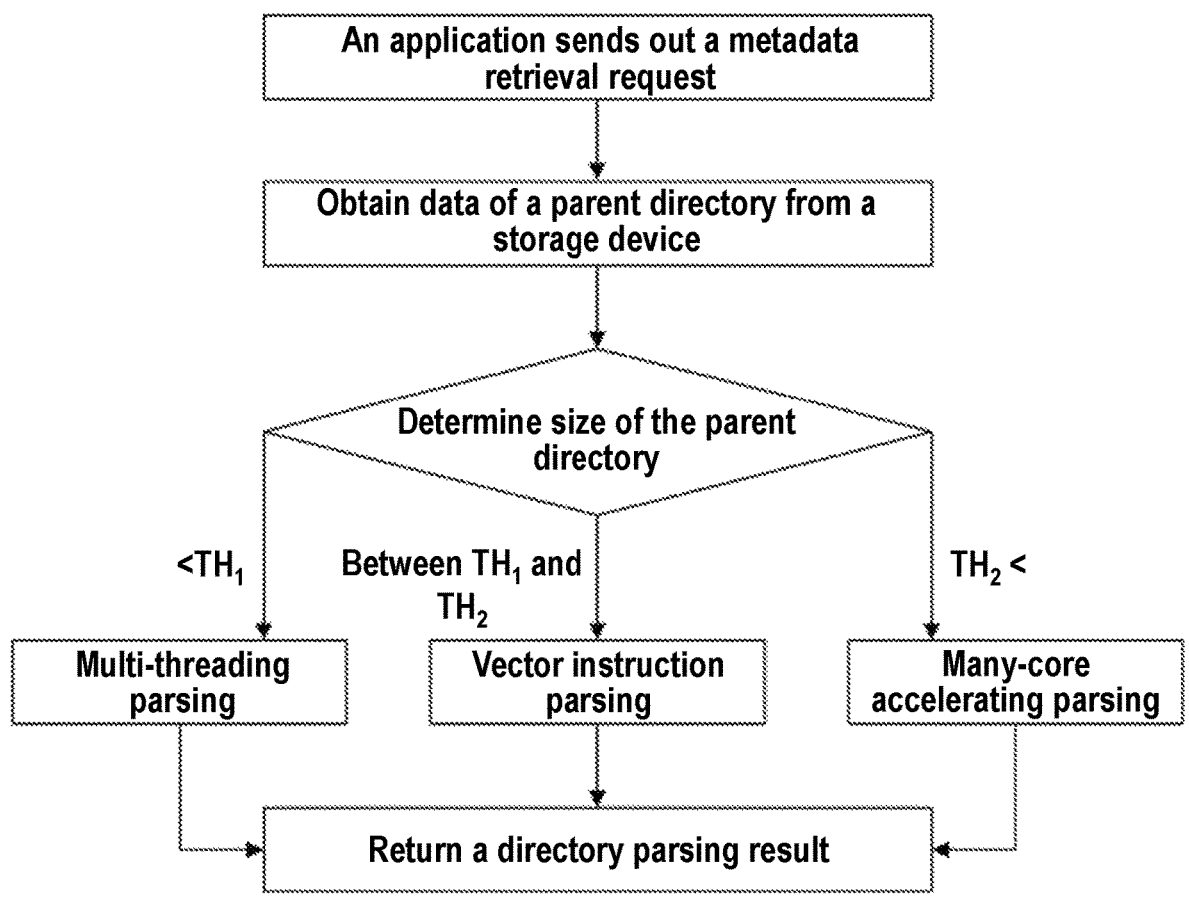
FIG. 4 shows a file system metadata retrieval process in embodiment 1 of the present invention.

As shown in FIG. 4, implementation steps for metadata retrieval comprise:

S1) organizing all directories and files in a file system in a tree structure, and saving all directories and subfiles under a single directory as a whole in a continuous address space of a underlying storage device in the order of creation in sequence; and S2) when performing file system metadata retrieval, parsing a directory path layer by layer from the first component to the last component in sequence and finally obtaining a directory or file to be accessed; and when parsing a subdirectory under a parent directory, reading all data on the continuous address space corresponding to the parent directory, and then searching a target subdirectory or subfile on the read data until the match is successful.

In the present embodiment, the searching a target subdirectory or subfile on the read data specifically is a reverse processing from the tail of the continuous address space to a head, and terminating the retrieval process and immediately returning to the corresponding metadata once the subdirectory/subfile to be searched is retrieved. In the present embodiment, special acceleration is implemented for the retrieval of active files/directories through the reverse processing from the tail of the continuous address space to the head thereof. The specific reasons are as follows: in general, the recently created or updated files are hot files, and are more likely to be accessed again. In the present embodiment, all subdirectories/subfiles under a parent directory are saved on a continuous address space in the order of creation/update in sequence. In the process of directory parsing, the reverse processing starts from the tail of the continuous address space to the head thereof. Due to the fact that the recently created or updated files are closer to the tail, the reverse processing leads to faster retrieval. This optimization method can significantly reduce retrieval delay of the hot directories/files.

Because the present embodiment still uses the tree directory structure, the overall process of directory path parsing is the same as that of a traditional file system: parsing from the first component of the directory path to the last component in sequence, and finally obtaining the directory or file to be accessed. The difference between the present embodiment and the traditional file systems lies in that when parsing a specific component, how to obtain the metadata information corresponding to the component from the parent directory of the component, i.e. the parsing method of a single directory. This problem greatly depends on the storage structure of all subdirectories/subfiles under a directory. EXT4 uses HTree to index all subdirectories/subfiles under a parent directory, and the process of parsing a subdirectory under a parent directory is HTree search. TableFS uses LevelDB to save all subdirectories/subfiles under a parent directory, and the process of parsing a subdirectory under a parent directory is to read a corresponding Value for a Key in LevelDB. In the present embodiment, the metadata of all subdirectories/subfiles under a parent directory is saved as a whole on the continuous address space. To parse a subdirectory under a parent directory, all data on the continuous address space need to be read, and then the target subdirectory or subfile is searched on the read data. In the present embodiment, because no index is established for all the subdirectories/subfiles under the same parent directory, and the metadata corresponding to the subdirectories/subfiles is not sorted on the continuous address space, the search process is actually a linear search operation, and all the subdirectories/subfiles need to be checked until the match is successful.

In the present embodiment, the parsing a subdirectory under a parent directory comprises the following detailed steps:

S2.1) receiving a metadata retrieval request from an application, and the metadata retrieval request being to retrieve existence of the target directory or file from a parent directory;

S2.2) obtaining related information of all the subdirectories/subfiles under the parent directory into a memory through one read operation, and going to step S2.3);

S2.3) determining size of the parent directory to be parsed, and going to step S2.4) if the total number of the subdirectories/subfiles in the parent directory is less than a preset first threshold $TH_1$; or going to step S2.5) if the total number of the subdirectories/subfiles in the parent directory is between the preset first threshold $TH_1$ and a preset second threshold $TH_2$; or going to step S2.6) if the total number of the subdirectories/subfiles in the parent directory is greater than the preset second threshold $TH_2$;

S2.4) using multi-threading technology to search the target subdirectory or subfile in the parent directory, and going to step S2.7); Because the target subdirectories or subfiles are saved as a whole on the continuous address space of the underlying storage device in the order of creation in sequence, each thread can be assigned to process different address segments of the continuous address space separately to achieve acceleration.

S2.5) using a vector instruction to search the target subdirectory or subfile in the parent directory, and going to step S2.7);

Because the target subdirectories or subfiles are saved as a whole on the continuous address space of the underlying storage device in the order of creation in sequence, the continuous address space can be traversed by for loop for processing, and the vector instruction acceleration is to reduce iterations of the for loop by using the vector instruction, thus achieving the acceleration effect.

S2.6) using many-core acceleration technology to search the target subdirectory or subfile in the parent directory, and going to step 52.7); and Because the target subdirectories or subfiles are saved as a whole on the continuous address space of the underlying storage device in the order of creation in sequence, each processor core can be assigned to process different address segments of the continuous address space separately to achieve acceleration.

S2.7) succeeding in the retrieval if the target subdirectory or subfile is found in the parent directory; or failing in the retrieval, and returning a retrieval result to an upper application.

Refer to steps S2.4) to S2.7), in the present embodiment, the multi-threading, vector processing, many-core acceleration and other technologies are jointly used to accelerate the directory parsing process. In the present embodiment, no index is established for all the subdirectories/subfiles under the same parent directory, when retrieving a file under a parent directory, the file needs to match with all the subdirectories/subfiles under the parent directory, so the linear search process results in high computation overhead. In the present embodiment, three technologies, namely multi-threading, vector processing and many-core acceleration, are selected flexibly according to the size of the parent directory to accelerate the matching process, which can significantly shorten computation time. In essence, the present embodiment uses the method of replacing IO with computation to reduce delay of the directory parsing. The key reason for good results with the method is that concurrent IO operations are very difficult in the directory parsing process, and the computational process can be significantly accelerated with the help of current parallel computing technology.

It is generally believed that the linear search results in very high computation overhead. However, current processors are generally integrated with multi-core multi-threading technology and vector operation units, and many-core processors represented by GPU can derive thousands of threads. Inherent parallel performance of these new computation units can significantly improve the performance of the linear search. In this context, a fusion scheme is proposed in the present embodiment, which uses three technologies, namely multi-threading, vector operation and many-core acceleration, respectively to implement parallel parsing for directories of different sizes. Specifically, two thresholds $TH_1$ and $TH_2$ are set in the present embodiment, both of which are integers and $TH_1 < TH_2$. Assuming that subdirectories/subfiles b need to be retrieved from a parent directory a, when the number of subdirectories/subfiles under the directory a is less than $TH_1$, the number of subdirectories/subfiles under the directory b is less, and the CPU thread can be used to implement the directory parsing; when the number of subdirectories/subfiles under the directory a is between $TH_1$ and $TH_2$, the number of subdirectories/subfiles under the directory b is more, and the CPU vector instruction can be used to implement the concurrent parsing; and when the number of subdirectories/subfiles under the directory a is greater than $TH_2$, the number of subdirectories/subfiles under the directory b is great, and co-processor represented by the CPU can be used to implement the concurrent parsing. In a word, different acceleration methods are used in the present embodiment to parse directories of different sizes to ensure that the computational process will not introduce a high delay in the directory parsing.

As mentioned above, in the present embodiment, all metadata update operations are recorded by means of log appending, which makes all subdirectories/subfiles under a parent directory conform to the following two features in storage: (I) the newly created subdirectories/subfiles are stored closer to the tail of the continuous address space corresponding to the parent directory; and (II) the newly updated subdirectories/subfiles are stored closer to the tail of the continuous address space corresponding to the parent directory.

In view of the two features, the present embodiment proposes an acceleration optimization scheme: reverse processing from the tail of the continuous address space to the head during directory retrieval, and terminating the retrieval process and immediately returning to the corresponding metadata once the subdirectory/subfile to be searched is retrieved. Step S2.4), step S2.5) and step S2.6) search the target subdirectory or subfile in the parent directory by the reverse processing from the tail of the continuous address space to the head. In addition, the above acceleration optimization method can be used in at least one of the step S2.4), step S2.5) and step S2.6) as required.

This optimization measure has similar acceleration effect for the above two scenarios: 1. according to the principle of locality, the newly created file is easier to be accessed by the upper application again, while in the present embodiment, the newly created file is saved in the tail of the continuous address space, and the reverse processing from the tail to the head can retrieve the newly created file more quickly; and 2. according to the principle of log update, the latest update of a directory or file is always stored closer to the tail of the log, and the reverse processing from the tail to the head can ensure that the metadata version retrieved first is the latest update information. In a word, the optimization method of reverse retrieval from the tail to the head proposed in the present embodiment can accelerate metadata access of active files.

In addition, the present embodiment also provides a metadata management system, comprising a computer system programmed to execute the steps of the metadata management method of the present embodiment, or a computer program programmed to execute the metadata management method of the present embodiment is stored on a storage medium of the computer system. The present embodiment also provides a computer-readable storage medium on which a computer program programmed to execute the metadata management method of the present embodiment is stored.

Embodiment 2

The present embodiment is essentially the same as the embodiment 1, and main differences are that the present embodiment is a subset of the embodiment 1, and the present embodiment only contains the relevant content of the metadata update in the embodiment 1, and provides a corresponding metadata management system and a computer-readable medium.

Embodiment 3

The present embodiment is essentially the same as the embodiment 1, and main differences are that the present embodiment is a subset of the embodiment 1, and the present embodiment only contains the relevant content of the metadata retrieval in the embodiment 1, and provides a corresponding metadata management system and a computer-readable medium.

The above are only preferred embodiments of the present invention, and the protection scope of the present invention is not limited to the embodiments mentioned above. The technical solutions under the ideas of the present invention fall into the protection scope of the present invention. It should be pointed out that, for an ordinary person skilled in the art, some improvements and modifications without departing from the principle of the present invention shall be deemed as the protection scope of the present invention.

What is claimed is:

1. A metadata management method executed by a metadata management system comprising a computer system, wherein the computer system comprises a processor and a non-transitory storage medium, wherein implementation steps for updating metadata in the metadata management method comprises:
   1) organizing, by the processor, all directories and files in a file system of the non-transitory storage medium in a tree structure, and saving, by the processor, all directories and subfiles under a single directory as a whole on a continuous address space of an underlying non-transitory storage medium in an order of creation in sequence; and
   2) updating, by the processor, all subdirectories/subfiles under the single directory in a form of a log when updating the metadata of the file system, and appending, by the processor, all metadata updates to a tail of the continuous address space corresponding to the single directory in an order of occurrence so that each metadata operation triggers only one IO request to the non-transitory storage medium,
   wherein implementation steps for metadata retrieval comprise:
   S1) organizing, by the processor, all the directories and the files in the file system of the non-transitory storage medium in the tree structure, and saving, by the processor, all the directories and the subfiles under the single directory as the whole in the continuous address space of the underlying non-transitory storage medium in the order of creation in sequence; and
   S2) when the processor performs file system metadata retrieval, the processor parses a directory path of the non-transitory storage medium layer by layer from a first component to a last component in sequence and finally obtains a directory or a file to be accessed in the non-transitory storage medium; and when the processor parses a subdirectory under a parent directory, the processor reads all data on the continuous address space of the non-transitory storage medium corresponding to the parent directory, and then searches a target subdirectory or a subfile on read data of the non-transitory storage medium until a match is successful, wherein the metadata retrieval is optimized according to a principle of locality,
wherein parsing the subdirectory under the parent directory comprises following detailed steps:
S2.1) the processor receives a metadata retrieval request from an application, and the metadata retrieval request being to retrieve an existence of the target directory or file from the parent directory;
S2.2) the processor obtains related information of all the subdirectories/subfiles under the parent directory into the non-transitory storage medium through one read operation, and going to step S2.3);
S2.3) the processor determines a size of the parent directory to be parsed, and the processor executes step S2.4) if the total number of the subdirectories/subfiles in the parent directory is less than a preset first threshold $TH_1$; or the processor executes step S2.5) if the total number of the subdirectories/subfiles in the parent directory is between the preset first threshold $TH_1$ and a preset second threshold $TH_2$; or the processor executes step S2.6) if the total number of the subdirectories/subfiles in the parent directory is greater than the preset second threshold $TH_2$;
S2.4) the processor uses multi-threading technology to search the target subdirectory or subfile in the parent directory, and going to step S2.7);
S2.5) the processor uses a vector instruction to search the target subdirectory or subfile in the parent directory, and going to step S2.7);
S2.6) the processor uses many-core acceleration technology to search the target subdirectory or subfile in the parent directory, and going to step S2.7); and
S2.7) the processor succeeds in the retrieval if the target subdirectory or subfile is found in the parent directory of the non-transitory storage medium; or the processor fails in the retrieval, and returns a retrieval result to an upper application,
wherein a linear search process is performed when searching the target subdirectory or the subfile in the parent directory because no index is established for all the subdirectories/subfiles under the same parent directory to save IO operation, wherein the multi-threading technology, the vector instruction and the many-core acceleration technology shorten a computation time of the linear search process.

2. The metadata management method according to claim 1, wherein detailed steps of the step 2) comprise:
2.1) receiving a metadata update operation by the file system from an application;
2.2) the processor determines a type of the metadata update operation, and the processor executes step 2.3) if the type is creating a new directory or file, or the processor executes step 2.4) if the type is updating an existing directory or file, or the processor executes step 2.5) if the type is deleting an existing directory or file;
2.3) the processor generates a file/directory creation log, and going to step 2.6);
2.4) the processor generates a directory/file update log, and going to step 2.6);
2.5) the processor generates a directory/file deletion log, and going to step 2.6);
2.6) the processor appends the generated log to the tail of the continuous address space, and going to step 2.7); and
2.7) the processor persists the tail of the continuous address space to the non-transitory storage medium.

3. The metadata management method according to claim 1, wherein the processor searches the target subdirectory or the subfile on the read data by a reverse processing from the tail of the continuous address space to a head of the continuous address space, and the processor terminates the retrieval process and immediately returning to the corresponding metadata once the subdirectory/subfile to be searched is retrieved.

4. The metadata management method according to claim 1, wherein, in at least one of the step S2.4), step S2.5) and Step S2.6), when the processor searches the target subdirectory or subfile in the parent directory, the processor searches by reverse processing from the tail of the continuous address space to the head of the continuous address space.

5. A metadata management system, comprising a computer system, wherein, the computer system programmed to execute the steps of the metadata management method of claim 1, or a computer program programmed to execute the metadata management method of claim 1 is stored on a non-transitory storage medium of the computer system.

6. A computer-readable non-transitory storage medium, wherein, on which a computer program programmed to execute the metadata management method of claim 1 is stored.

7. A metadata management system, comprising a computer system, wherein, the computer system programmed to execute the steps of the metadata management method of claim 2, or a computer program programmed to execute the metadata management method of claim 2 is stored on a non-transitory storage medium of the computer system.

8. A metadata management system, comprising a computer system, wherein, the computer system programmed to execute the steps of the metadata management method of claim 3, or a computer program programmed to execute the metadata management method of claim 3 is stored on a non-transitory storage medium of the computer system.

9. A metadata management system, comprising a computer system, wherein, the computer system programmed to execute the steps of the metadata management method of claim 4, or a computer program programmed to execute the metadata management method of claim 4 is stored on a non-transitory storage medium of the computer system.

10. A computer-readable storage non-transitory medium, wherein, on which a computer program programmed to execute the metadata management method of claim 2 is stored.

11. A metadata management method executed by a metadata management system comprising a computer system, wherein the computer system comprises a processor and a non-transitory storage medium, wherein implementation steps for metadata retrieval in the metadata management method comprises:
S1) organizing, by the processor, all directories and files in a file system of the non-transitory storage medium in a tree structure, and saving, by the processor, all directories and subfiles under a single directory as a whole in a continuous address space of an underlying non-transitory storage medium in an order of creation in sequence; and
S2) when the processor performs file system metadata retrieval, the processor parses a directory path of the non-transitory storage medium layer by layer from a first component to a last component in sequence and finally obtaining a directory or a file to be accessed in the non-transitory storage medium; and when the processor parses a subdirectory under a parent directory, the processor reads all data on the continuous address space of the non-transitory storage medium, and then searches a target subdirectory or a subfile on read data until a match is successful, wherein the metadata retrieval is optimized according to a principle of locality, wherein, parsing the subdirectory under the parent directory comprises following detailed steps:

S2.1) the processor receives a metadata retrieval request from an application, and the metadata retrieval request being to retrieve an existence of the target directory or file from the parent directory;

S2.2) the processor obtains related information of all the subdirectories/subfiles under the parent directory into a memory through one read operation, and going to step S2.3);

S2.3) the processor determines a size of the parent directory to be parsed, and the processor executes step S2.4) if the total number of the subdirectories/subfiles in the parent directory is less than a preset first threshold $TH_1$; or the processor executes step S2.5) if the total number of the subdirectories/subfiles in the parent directory is between the preset first threshold $TH_1$ and a preset second threshold $TH_2$; or the processor executes step S2.6) if the total number of the subdirectories/subfiles in the parent directory is greater than the preset second threshold $TH_2$;

S2.4) the processor uses multi-threading technology to search the target subdirectory or subfile in the parent directory, and going to step S2.7);

S2.5) the processor uses a vector instruction to search the target subdirectory or subfile in the parent directory, and going to step S2.7);

S2.6) the processor uses many-core acceleration technology to search the target subdirectory or subfile in the parent directory, and going to step S2.7); and S2.7) the processor succeeds in the retrieval if the target subdirectory or subfile is found in the parent directory of the non-transitory storage medium; or the processor fails in the retrieval, and returning a retrieval result to an upper application, wherein a linear search process is performed when searching the target subdirectory or the subfile in the parent directory because no index is established for all the subdirectories/subfiles under the same parent directory to save IO operation, wherein the multi-threading technology, the vector instruction and the many-core acceleration technology shorten a computation time of the linear search process.

12. A metadata management system, comprising a computer system, wherein, the computer system programmed to execute the steps of the metadata management method of claim 11, or a computer program programmed to execute the metadata management method of claim 11 is stored on a non-transitory storage medium of the computer system.

\* \* \* \* \*